(12) United States Patent
Ooshiro et al.

(10) Patent No.: US 10,920,367 B2
(45) Date of Patent: Feb. 16, 2021

(54) THERMAL INSULATION SHEET AND MANUFACTURING METHOD THEREFOR

(71) Applicant: Panasonic Intellectual Property Management Co., Ltd., Osaka (JP)

(72) Inventors: Tatsuhiro Ooshiro, Hokkaido (JP); Takashi Tsuruta, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 71 days.

(21) Appl. No.: 16/083,279

(22) PCT Filed: Mar. 7, 2017

(86) PCT No.: PCT/JP2017/008881
§ 371 (c)(1),
(2) Date: Sep. 7, 2018

(87) PCT Pub. No.: WO2017/159438
PCT Pub. Date: Sep. 21, 2017

(65) Prior Publication Data
US 2019/0071818 A1 Mar. 7, 2019

(30) Foreign Application Priority Data
Mar. 18, 2016 (JP) .................. 2016-054892

(51) Int. Cl.
*D06M 11/79* (2006.01)
*C01B 33/16* (2006.01)
(Continued)

(52) U.S. Cl.
CPC ............ *D06M 11/79* (2013.01); *C01B 33/16* (2013.01); *C08J 5/04* (2013.01); *C08J 9/26* (2013.01);
(Continued)

(58) Field of Classification Search
CPC .. C08J 9/26; C08J 5/04; D06M 11/79; D06M 11/11; D06M 13/507; D06M 13/513; C01B 33/16; F16L 59/04
See application file for complete search history.

(56) References Cited

U.S. PATENT DOCUMENTS

| 6,068,882 A * | 5/2000 | Ryu ...................... C04B 14/302 427/246 |
| 2002/0061396 A1* | 5/2002 | White ..................... B29C 70/12 428/293.4 |

(Continued)

FOREIGN PATENT DOCUMENTS

| JP | 2004-340415 | 12/2004 |
| JP | 2014-237910 | 12/2014 |

(Continued)

OTHER PUBLICATIONS

The Extended European Search Report dated Mar. 1, 2019 for the related European Patent Application No. 17766440.6.
(Continued)

*Primary Examiner* — Hai Vo
(74) *Attorney, Agent, or Firm* — McDermott Will and Emery LLP

(57) ABSTRACT

A thermal insulation sheet is used that includes a fiber, a silica aerogel contained in the fiber, and a fibrous cavity. A method for manufacturing a thermal insulation sheet is used that includes: an impregnation step of impregnating a silica aerosol in a nonwoven fabric substrate containing a fiber that is insoluble in an acidic solution, and a fiber that is soluble in the acidic solution; a gelling step of gelling the silica aerosol; a hydrophobizing step of hydrophobizing the gel; and a drying step of drying the gel. The fiber that is soluble in the acidic solution is dissolved in the hydrophobizing step.

4 Claims, 3 Drawing Sheets

(51) Int. Cl.
    *C08J 5/04*     (2006.01)
    *C08J 9/26*     (2006.01)
    *F16L 59/04*     (2006.01)
    *D06M 13/513*     (2006.01)
    *D06M 11/11*     (2006.01)
    *D06M 13/507*     (2006.01)
    *D06M 101/32*     (2006.01)
    *D06M 101/06*     (2006.01)
    *D06M 101/34*     (2006.01)

(52) U.S. Cl.
    CPC .......... *D06M 11/11* (2013.01); *D06M 13/507* (2013.01); *D06M 13/513* (2013.01); *F16L 59/04* (2013.01); *D06M 2101/06* (2013.01); *D06M 2101/32* (2013.01); *D06M 2101/34* (2013.01); *D06M 2400/02* (2013.01); *Y10T 428/249986* (2015.04)

(56) References Cited

U.S. PATENT DOCUMENTS

2012/0169016 A1*   7/2012   Hisano ................ B29C 44/5618
                                                    277/650
2016/0060808 A1    3/2016   Oikawa et al.

FOREIGN PATENT DOCUMENTS

WO       2011/043457       4/2011
WO       2013/053951 A1   4/2013

OTHER PUBLICATIONS

International Search Report of PCT application No. PCT/JP2017/008881 dated May 23, 2017.

* cited by examiner

THERMAL INSULATION SHEET AND MANUFACTURING METHOD THEREFOR

TECHNICAL FIELD

The technical field relates to a thermal insulation sheet, and a method for manufacturing same.

BACKGROUND

There has been development of information technology devices. This is accompanied by improving information processing capabilities in devices such as semiconductor devices, and the amount of heat generated by these devices has been increasing. To prevent these devices from malfunctioning or dying early from heat, there have been attempts to transfer the heat of semiconductor and other devices to a casing by using a metal heat sink or a graphite sheet. However, further measures are needed against heat to keep up with the advancing information technology devices.

For control, automobiles are equipped with a variety of electronic control units using large numbers of semiconductor devices. In today's automobiles, such electronic devices are often installed in the engine room to meet the demand for securing an installation space for control instruments, and the demand for creating enough cabin space. This has created an issue where the electronic components and electronic circuits need to be protected from the heat generated by an engine.

In batteries used for the increasing popular hybrid vehicles and electric vehicle, the generated heat from each cell heats the adjacent cells, and this may lead to a performance drop. Providing heat insulation for the cells has also become an important issue.

The devices mentioned above are only a few examples of devices that need to be protected from heat, and the use of a heat transfer member alone is not enough to deal with the ever increasing information processing capabilities, and the increasing demands for high-density installation, and for battery equipment used to support these advancing technologies. There accordingly is a need for a member that combines a heat transfer member and a heat-insulating material.

Among different types of heat-insulating materials, silica aerogel and silica xerogel are examples of heat-insulating materials having high heat insulation performance.

Silica aerogel and silica xerogel have pores smaller than the mean free path of 68 nm for air, and exhibit a desirable heat insulation effect because these materials conduct only a small amount of heat by conduction in solid, or by convection. This makes silica aerogel and silica xerogel useful materials for solving the heat insulation issue mentioned above. However, silica aerogel and silica xerogel have low mechanical strength, and it is difficult to use these materials by themselves. This drawback is addressed by a method that uses silica aerogel or silica xerogel as a heat-insulating material by impregnating it in a fiber.

Such a heat-insulating material shows desirable heat insulation by taking advantage of the desirable heat insulating property of silica aerogel and silica xerogel. A problem, however, is that a performance drop occurs in heat insulation when silica microparticles separate from the heat-insulating material during use.

JP-A-2014-237910 is a known example of related art that addresses the separation issue of silica aerogel.

In this related art, a fiber sheet containing silica xerogel and nanofibers is produced with the following method. The nanofibers are used to prevent separation of silica microparticles from the fiber sheet. The fiber sheet is produced in the following procedures.

After removing sodium from water glass, a fiber sheet containing nanofibers is impregnated with this solution before gelling the silica sol that has been adjusted to a gelling pH. The fiber sheet is then cured for skeleton reinforcement so that the silica pores can withstand the capillary force of solvent drying. This is followed by a hydrophobic process whereby the surface of the silica xerogel is hydrophobized with a mixed solution of a silylation agent and alcohols to remove the solvent present in the product. The product is a fibrous heat-insulating material.

However, a thermal insulation sheet having a thickness of about 1.5 mm or more needs to be produced if the fiber sheet of the foregoing related art were to provide a more sufficient heat insulation effect. In this case, a mixed solution of silylation agent and alcohols cannot permeate inside of the thermal insulation sheet, and hydrophobization does not easily take place. It also takes time to remove the solvent in the subsequent drying step.

SUMMARY

It is accordingly an object of the present disclosure to provide a method and a heat-insulating material that enable hydrophobization and solvent removal throughout a thick thermal insulation sheet, including inside of the sheet.

According to an aspect of the present disclosure, there is provided a method for manufacturing a thermal insulation sheet, the method including:

an impregnation step of impregnating a silica aerosol in a nonwoven fabric substrate containing a fiber that is insoluble in an acidic solution, and a fiber that is soluble in the acidic solution;

a gelling step of gelling the silica aerosol;

a hydrophobizing step of hydrophobizing the gel; and a drying step of drying the gel, the fiber that is soluble in the acidic solution being dissolved in the hydrophobizing step.

According to another aspect of the present disclosure, there is provided a thermal insulation sheet that includes a fiber, a silica aerogel contained in the fiber, and a fibrous cavity.

With the foregoing configuration, hydrochloric acid, and a mixed solution of a silylation agent and alcohol can permeate and discharge from the thermal insulation sheet, including inside of the thermal insulation sheet, using the cavity created by dipping in hydrochloric acid in the hydrophobizing step. In the subsequent drying step, the hydrochloric acid, the silylation agent, and alcohol can be released from the thermal insulation sheet to outside through the cavity. In this way, a thermal insulation sheet having a thermal conductivity of 24 mW/m·K or less can be produced even when a nonwoven fabric substrate having a thickness of 1.5 mm or more is used.

DESCRIPTION OF EMBODIMENTS

A method for manufacturing a thermal insulation sheet according to an embodiment of the present disclosure is described below, with reference to the accompanying drawings.

Figure 1:
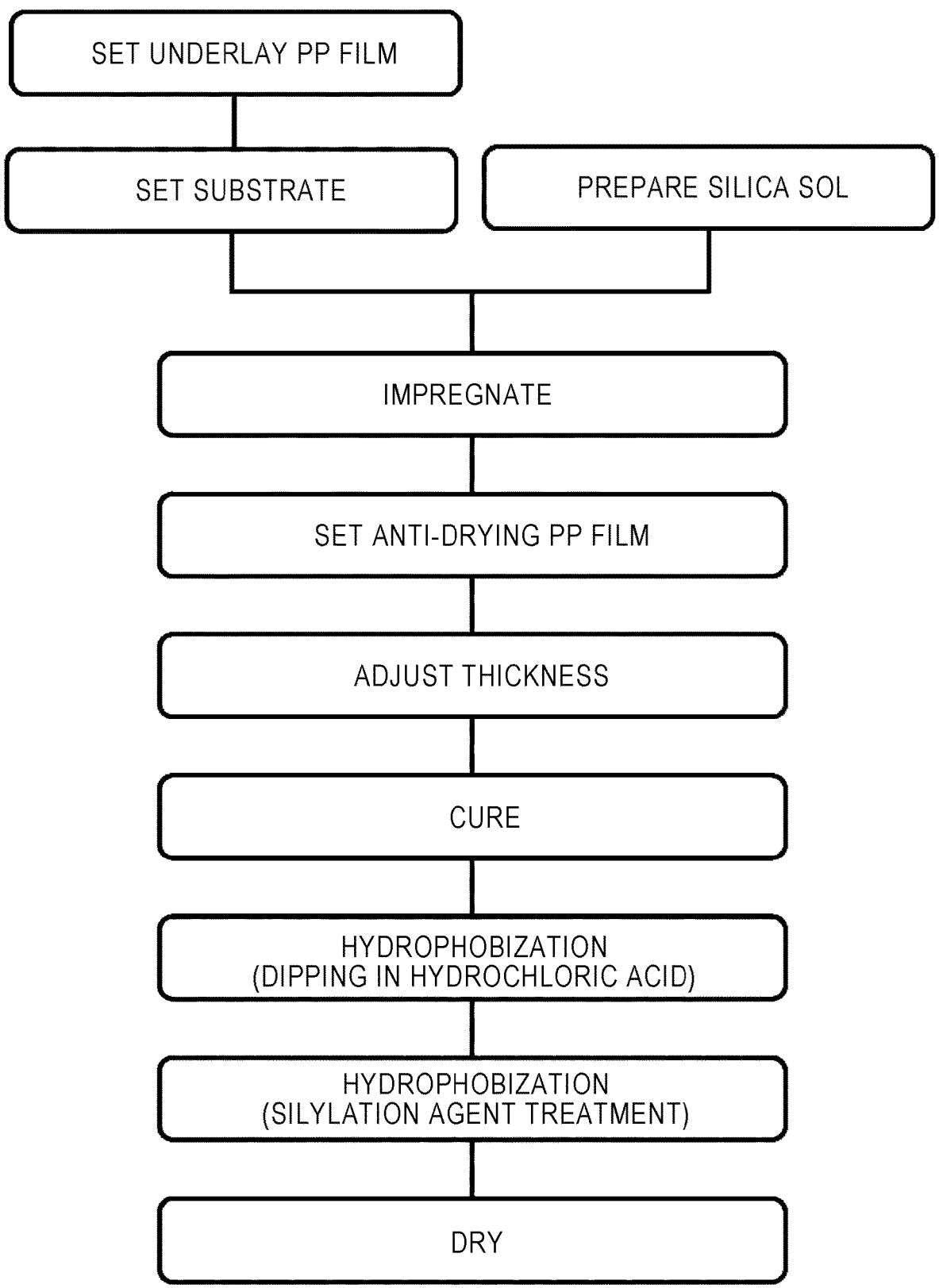
FIG. 1 is a diagram representing a method for manufacturing a thermal insulation sheet according to an embodiment.
Figure 2A:
FIG. 2A is a perspective view of a substrate used as a material of the thermal insulation sheet of the embodiment of the present disclosure.
Figure 2B:
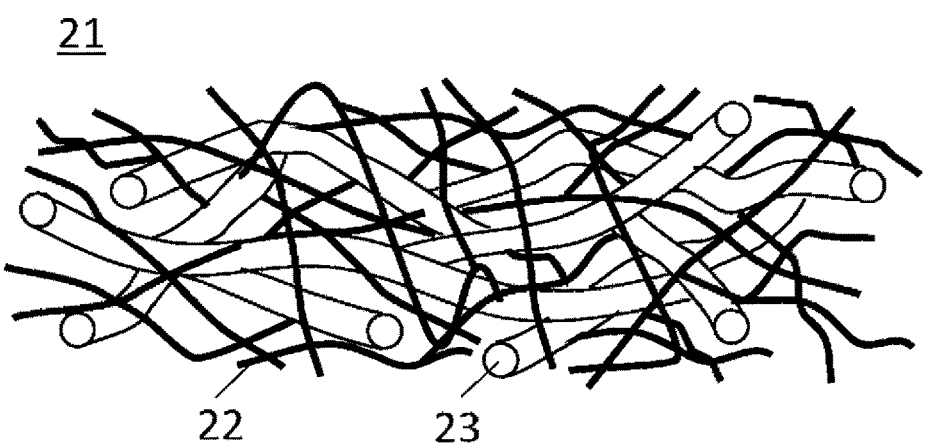
FIG. 2B is a partially enlarged side view of the substrate of FIG. 2A.
Figure 2C:
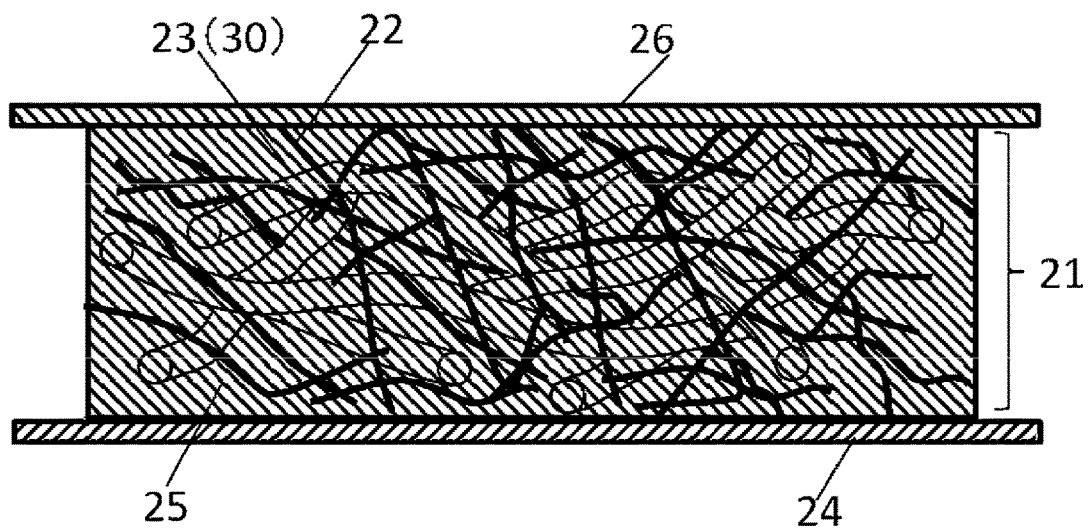
FIG. 2C is a side view showing the substrate soaked with silica sol in the embodiment of the present disclosure.
Figure 2D:
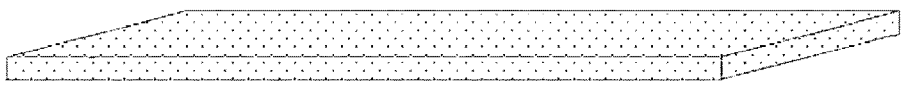
FIG. 2D is a perspective view of the thermal insulation sheet of the embodiment of the present disclosure.
Figure 3:
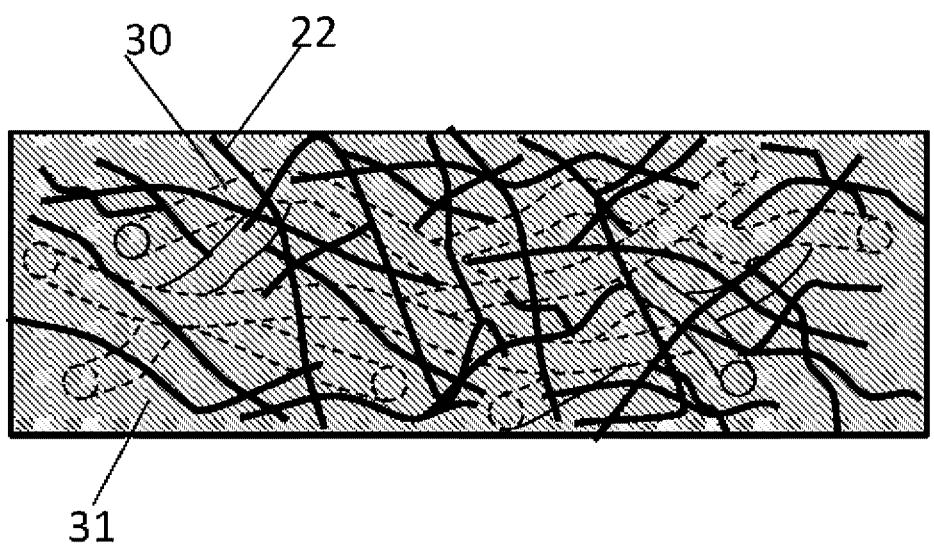
FIG. 3 is an enlarged side view of the thermal insulation sheet of the embodiment of the present disclosure.

FIG. 1 is step diagram for obtaining a thermal insulation sheet 27 of the embodiment. The thermal insulation sheet 27 of the embodiment is obtained in the manner described in the Overview section below. FIGS. 2A to 2D are diagrams describing the steps. FIG. 3 is an enlarged side view of the thermal insulation sheet 27 produced. FIG. 2A is a perspective view of a substrate 21. FIG. 2B is an enlarged side view of the substrate 21. FIG. 2C is a side view of the substrate 21 soaked with a silica sol solution 25. FIG. 2D shows the thermal insulation sheet 27 produced. FIG. 3 is an enlarged side view of the thermal insulation sheet 27.

Overview

First, an underlay PP film 24 (polypropylene film) is set, and the substrate 21 shown in FIG. 2A is placed thereon.

The silica sol solution 25, prepared in advance, is then poured onto the substrate 21 to impregnate the substrate 21 with silica sol.

After impregnation, an anti-drying PP film 26 (FIG. 2C) is placed over the substrate 21 to prevent the silica sol from drying. After a certain time period, the thickness is adjusted upon completion of the gelling of the silica sol solution 25. The thickness adjustment is followed by curing to reinforce the gel skeleton. The curing is followed by hydrophobization (dipping into hydrochloric acid, and a silylation treatment), and drying. The thermal insulation sheet 27 is obtained through these steps.

The following describes each step in greater detail.

Setting Substrate

The underlay PP film 24 is laid down. The substrate 21 is set on the underlay PP film 24. FIG. 2A shows the substrate 21. The substrate 21 contains two types of fibers. FIG. 2B is an enlarged cross sectional view of the substrate 21.

The substrate 21 contains a first fiber 22 and a second fiber 23.

The first fiber 22 is a fiber that is insoluble in an acidic solution. The first fiber 22 may be an organic material fiber of polyethylene terephthalate (PET). The first fiber 22 may use other materials, provided that it is insoluble in the acid used in the hydrophobizing step described below. The first fiber 22 may be an inorganic fiber. In this case, acid insoluble materials, for example, such as glass wool, and rock wool may be used. The first fiber 22 has a diameter $\phi$ of 0.001 to 0.02 mm.

The second fiber 23 is a fiber that is soluble in an acidic solution. The second fiber 23 may be at least one selected from nylon, rayon, cupra, acetate, vinylon, and cotton. Regardless of the material selected, the second fiber 23 needs to dissolve in the acid used for the hydrophobization (dipping in hydrochloric acid) described below. The second fiber 23 is preferably a fiber having a diameter of 0.01 to 0.2 mm, because such fibers are easily soluble.

When the second fiber 23 has a diameter of less than 0.01 mm, it may not be possible to promote permeation of a silylation agent even after the second fiber 23 has dissolved in an acid, and become cavities 30 in the hydrophobizing step described below.

When the second fiber 23 has a diameter of more than 0.2 mm, the second fiber 23 may fail to completely dissolve in an acid, and the undissolved portions may remain in the cavities 30 even after the desired processing time in the hydrophobizing step described below.

Preferably, the length of the acid soluble second fiber 23 is at least twice as long as the diameter of the second fiber 23. In this way, the second fiber 23 can dissolve in an acid, and becomes cavities 30 in the hydrophobizing step described below, and allows hydrochloric acid, and a mixed solution of silylation agent and alcohol to permeate and discharge through the cavities 30. A long second fiber 23 can form long cavities 30, and enables liquid movement. To further promote liquid movement, the second fiber 23 is preferably disposed in such a manner that the cavities 30 will be present in at least two surfaces of the thermal insulation sheet 27.

Here, the cavities 30 represent a space of substantially the same shape as the shape of the second fiber 23. That is, the space is in the form of the fiber. As with the case of the second fiber 23, the cavities 30 have a diameter of preferably 0.2 mm or less. The length of the cavities 30 is preferably at least twice as long as the diameter of the cavities 30.

In the next drying step, the acid, the silylation agent, and alcohol can easily be released from the thermal insulation sheet to outside through the cavities 30.

The fraction of the second fiber 23 with respect to the first fiber 22 is 1 to 10 weight %. When contained in a larger fraction, the second fiber 23 overly produces the cavities, and cannot provide a desirable heat insulation property.

The cavities 30 are 0.02 to 0.2 vol %. When the volume of cavities 30 is more than 0.2 vol %, the cavities 30 become a pathway of heat, and the thermal insulation properties decrease.

Preparation of Silica Sol

A high molar silicic acid aqueous solution (manufactured by Toso Sangyo Co., Ltd.; $SiO_2$ concentration 14%) is used as the silica material of the silica sol. A silica sol solution is prepared by adding 1.4% of concentrated hydrochloric acid as a catalyst to the silica material.

The silica material of the silica sol is not limited to a high molar silicic acid aqueous solution, and may be alkoxysilane, or water glass. As used herein, "high molar silicic acid aqueous solution" refers to a silica material having a lower sodium content than water glass, specifically 1% or less. With regard to $SiO_2$ concentration, the desired thermal conductivity can be obtained when the $SiO_2$ concentration is 5% to 14%, regardless of the type of the silica material used.

Various acids may be used as catalysts. However, considering promotion of the hydrolysis reaction of silicic acid, the strength of the gel skeleton, and the subsequent hydrophobizing step, it is desirable to use hydrochloric acid. The concentration is preferably 1 N to 12 N, more preferably 6 N to 12 N.

Impregnation

The silica sol is used in an amount that is at least the theoretical space volume determined from the bulk density of the substrate 21, and that can completely fill the voids inside the substrate 21. At the completion of impregnation, the anti-drying PP film 26 is placed over the impregnated substrate 21 so that the moisture in the silica sol does not easily evaporate, and drying of the silica sol is prevented. The voids inside the substrate 21 become aerogel after the subsequent steps. The aerogel content is preferably 20 to 80 weight %, more preferably 40 to 70 weight %, though it depends on the bulk density of the substrate 21. The desired heat insulation may not be obtained with an aerogel content of less than 40 weight %. An aerogel content of more than 70 weight % may result in poor productivity or poor economy.

Gelation

After impregnation, the substrate 21 is allowed to stand for 20 minutes, until gelation takes place. Once gelled, the substrate 21 is pressed to adjust thickness. The thickness may be adjusted by using a method such as roll pressing.

Curing

The substrate 21 of the adjusted thickness is put in a container, and stored in a constant temperature and humidity vessel (temperature 85° C., humidity 85%) for 3 hours to grow silica secondary particles, and reinforce the gel skeleton structure. The storage temperature is preferably less than 100° C. The humidity is preferably 80% or more so that the moisture does not easily evaporate from the gel contained in the substrate. The storage time is preferably from 0.5 hours to 6 hours.

Hydrophobization (Dipping in Hydrochloric Acid)

After the curing treatment, the substrate 21 is taken out of the constant temperature and humidity vessel, and subjected to hydrophobization (dipping in hydrochloric acid) after removing the PP films 24 and 26 (FIG. 2C).

The substrate 21 impregnated with the gel is dipped in 12 N hydrochloric acid for 1 hour to cause a reaction between the gel and hydrochloric acid. Here, the acid soluble second fiber 23 contained in the substrate 21 dissolves in hydrochloric acid, and creates cavities 30. Through the cavities 30, hydrochloric acid can permeate the substrate 21, including inside of the substrate 21, even when the substrate 21 is thick.

The second fiber 23 needs to have a diameter of 1 μm or more to accept and discharge solution. The diameter of the second fiber 23 is preferably 10 μm or more, more preferably 50 μm or more. The cavities 30 are spaces created as a result of dissolving of the second fiber 23, and are fibrous in shape.

Hydrophobization (Silylation Agent Treatment)

The dipping in hydrochloric acid is followed by a second hydrophobization step, in which the substrate is dipped in a mixed solution of a silylation agent and alcohol (octatrimethyl trisiloxane, and 2-propanol), and stored in a 55° C. thermostat bath for 2 hours.

Here, the mixed solution of a silylation agent and alcohol also permeates inside of the substrate 21 using the cavities 30 formed in the hydrochloric acid treatment. As the reaction proceeds, and the trimethylsiloxane bond starts to form, the hydrochloric acid water discharges from the substrate 21 containing the gel.

Here, the hydrochloric acid incorporated inside the substrate 21 is also able to discharge from the substrate 21 by the effect of the cavities 30, even when the substrate 21 (FIG. 2A) is thick.

Drying

The first and second hydrophobization steps are followed by a drying treatment, which is performed in a 150° C. thermostat bath for 2 hours. Here, the substrate 21, including inside of the substrate 21, can completely dry by the effect of the cavities 30 formed in the substrate 21, even when the substrate 21 is thick.

The thermal insulation sheet 27 shown in FIG. 2D can be obtained through these procedures. FIG. 3 shows an enlarged side view of the thermal insulation sheet 27. The thermal insulation sheet 27 contains the first fiber 22, the silica aerogel 31, and the cavities 30. The silica sol has turned into silica aerogel. The thermal insulation sheet 27 produced is thicker than traditional single-layer thermal insulation sheets.

EXAMPLES

The embodiment is described below by way of Examples. The embodiment, however, is not limited by the following Examples. All procedures were performed at 25° C. in the atmosphere, except for heating such as in a thermostat bath.

In Examples, the substrate 21 was used in a fixed basis weight (550 to 580 g/m² per unit area), and the thermal insulation sheet 27 was obtained by varying the proportion of the mixed second fiber 23.

The thermal insulation sheet 27 produced had a thickness of about 4 mm. The fraction of the second fiber 23 is not limited to the proportions used in Examples.

Evaluation

For evaluation, the thermal insulation sheet 27 was measured for thickness and thermal conductivity.

A Digimatic Indicator H0530 (manufactured by Mitsutoyo Corporation) was used for thickness measurement. A measurement was made at nine measurement points on a plane of each sample under the pressure of 7.4 kPa, and the results were averaged to find the thickness.

Thermal conductivity was measured using a heat flowmeter HFM 436 Lambda (manufactured by NETZSCH).

The results are presented in Table 1. Samples were determined as being acceptable when the measured thermal conductivity was 24 mW/m·K or less, a value about 10% smaller than the thermal conductivity of 26 mW/m·K in still air.

TABLE 1

| | Example 1 | Example 2 | Comparative Example 1 |
|---|---|---|---|
| Basis weight of substrate 21 (g/cm³) | 577 | 553 | 558 |
| Thickness of substrate 21 (mm) | 4.79 | 4.99 | 4.67 |
| Area of substrate 21 (mm²) | 120 × 120 | 120 × 120 | 120 × 120 |
| Weight of substrate 21 (g) | 8.31 | 7.97 | 8.04 |
| Diameter of fiber 23 (mm) | 0.1 | 0.2 | — |
| Content of fiber 23 (wt %) | 1.5 | 6.4 | — |
| Weight of impregnated sheet (g) | 72.1 | 71.1 | 73.1 |
| Gel content (wt %) | 63.79 | 63.13 | 65.06 |
| Amount of discharged hydrochloric acid in hydrophobization (g) | 84.2 | 83.2 | 72.2 |
| Thickness of thermal insulation sheet 27 (mm) | 4.15 | 4.09 | 4.23 |
| Weight of thermal insulation sheet 27 (g) | 18.97 | 18.33 | 18.94 |
| Weight difference between thermal insulation sheet 27 and substrate 21 (g) | 10.66 | 10.36 | 10.89 |
| Gel content in thermal insulation sheet 27 (wt %) | 56.2 | 56.5 | 57.5 |
| Thermal conductivity of thermal insulation sheet 27 (mW/mK) | 21.7 | 21.8 | Unmeasurable |

Example 1

A substrate 21 was prepared that contained a nonwoven fabric as the inorganic first fiber 22, and a nylon second fiber 23 that was 1.5% of the weight of the inorganic first fiber 22, and had a diameter of 0.1 mm, and a length at least twice as long as the diameter. The treatment followed the procedures described in the embodiment. The finished thermal insulation sheet 27 had a thickness of 4.15 mm. The thermal conductivity was 21.7 mW/m·K, and the thermal insulation sheet 27 had the desired properties.

Example 2

A substrate 21 was prepared that contained a nonwoven fabric as the inorganic first fiber 22, and a nylon second fiber 23 that was 6.4% of the weight of the inorganic first fiber 22, and had a diameter of 0.2 mm, and a length at least twice as long as the diameter. The treatment followed the procedures described in the embodiment. The finished thermal insulation sheet 27 had a thickness of 4.09 mm. The thermal conductivity was 21.8 mW/m·K, and the thermal insulation sheet 27 had the desired properties.

Comparative Example 1

A nonwoven fabric of solely inorganic first fiber 22 was used. The treatment followed the procedures described in the embodiment. The finished product had a thickness of 4.23 mm. It was not possible to measure thermal conductivity because of seeping of a solution—seemingly a mixture of hydrochloric acid and a silylation agent—from inside of the sheet. It was indeed not possible to obtain a normal thermal insulation sheet under these conditions.

Comparative Example 2

A substrate 21 was prepared that contained a nonwoven fabric as the inorganic first fiber 22, and a nylon second fiber 23 that was 25.6% of the weight of the inorganic first fiber 22, and had a diameter of 0.4 mm, and a length at least twice as long as the diameter. The treatment followed the procedures described in the embodiment. With the second fiber 23 having a diameter of 0.4 mm or more, the soluble second fiber 23 failed to completely dissolve in the hydrophobization (dipping in hydrochloric acid), and the undissolved portions of the second fiber 23 remained inside the cavities created as a result of dissolving of the second fiber 23 in the acidic solution.

This prevents permeation of the silylation agent, and discharge of hydrochloric acid water in the subsequent silylation step. In the later drying step, the remaining fibers are burned, and this produces unwanted ashes and smoke. It was indeed not possible to obtain a normal thermal insulation sheet under these conditions.

Discussion and Example Summary

As can be seen in the discharge amount of hydrochloric acid (g) in hydrophobization (silylation agent treatment) in Table 1, the discharge amounts of hydrochloric acid in Examples 1 and 2 are larger than in Comparative Example 1 by 12 g and 11 g, respectively.

This is because the hydrophobization (silylation agent treatment), and the discharge of the hydrochloric acid water generated by this treatment used the cavities 30 created as a result of the acid soluble second fiber 23 (in these examples, nylon fibers having diameters of 0.1 mm and 0.2 mm) dissolving in one hour of dipping in the hydrophobization treatment (dipping in hydrochloric acid).

Because of this effect, seeping of seemingly a mixture of hydrochloric acid and a silylation agent as observed in Comparative Example 1 from inside of the finished thermal insulation sheet was not observed in Examples 1 and 2. It was also possible to obtain a thermal insulation sheet 27 having a desirable thermal conductivity. It was indeed possible to at least produce a thermal insulation sheet having a thickness of 1.5 mm or more using the method.

FINAL NOTE

The acid, for which hydrochloric acid was used in the embodiment, may be an acid other than hydrochloric acid. The curing step is not necessarily required. However, a more desirable thermal insulation sheet 27 can be produced when the curing step is performed.

The thermal insulation sheet 27 obtainable with the method of the embodiment is a single-layer sheet, not a laminate, and has a thickness of 1.5 mm or more. The thickness is preferably 2 mm or more, more preferably 3 mm or more.

A thermal insulation sheet of desirable heat insulating property having a thickness of 1.5 mm or more can be obtained with the thermal insulation sheet manufacturing method of the embodiment of the present disclosure. The thermal insulation sheet 27 of the embodiment has use for heat insulation purposes in a wide range of applications, including various electronic devices, houses, and vehicles such as automobiles, and is useful in industry.

What is claimed is:

1. A thermal insulation sheet comprising:
   a silica aerogel;
   a plurality of fibers contained in the silica aerogel; and
   a plurality of cavities formed in the silica aerogel,
   wherein each of the plurality of cavities has a fiber-shape and has a diameter of 0.2 mm or less, and a length that is at least twice the diameter,
   wherein the plurality of cavities have a volume fraction of 0.02 to 2 vol %, and
   wherein the silica aerogel has a weight fraction of 40 to 70 weight % of the thermal insulation sheet.

2. The thermal insulation sheet according to claim 1, which is a single-layer sheet, is not a laminate, and has a thickness of 1.5 mm or more.

3. The thermal insulation sheet according to claim 1, wherein each of the plurality of cavities has a diameter of from 0.01 mm to 0.2 mm, and a length that is at least twice the diameter.

4. The thermal insulation sheet according to claim 1, wherein the plurality of cavities are present in at least two surfaces of the thermal insulation sheet.

* * * * *